(No Model.)

C. BECKER, Sr.
CLOCK ESCAPEMENT.

No. 334,068. Patented Jan. 12, 1886.

FIG. 3ª.

WITNESSES
Wm A Lowe
Robt H Roy

INVENTOR
Christopher Becker Sr.
by his attorneys
Roeder & Brieren

UNITED STATES PATENT OFFICE.

CHRISTOPHER BECKER, SR., OF NEW ROCHELLE, NEW YORK.

CLOCK-ESCAPEMENT.

SPECIFICATION forming part of Letters Patent No. 334,068, dated January 12, 1886.

Application filed August 13, 1885. Serial No. 174,263. (No model.)

*To all whom it may concern:*

Be it known that I, CHRISTOPHER BECKER, Sr., of New Rochelle, Westchester county, State of New York, have invented a new and Improved Chronometer, of which the following specification is a full, clear, and exact description.

This invention relates to various improvements in chronometers, and more particularly to the escapement.

The invention consists in the various elements of improvement hereinafter more fully pointed out.

Figure 1:
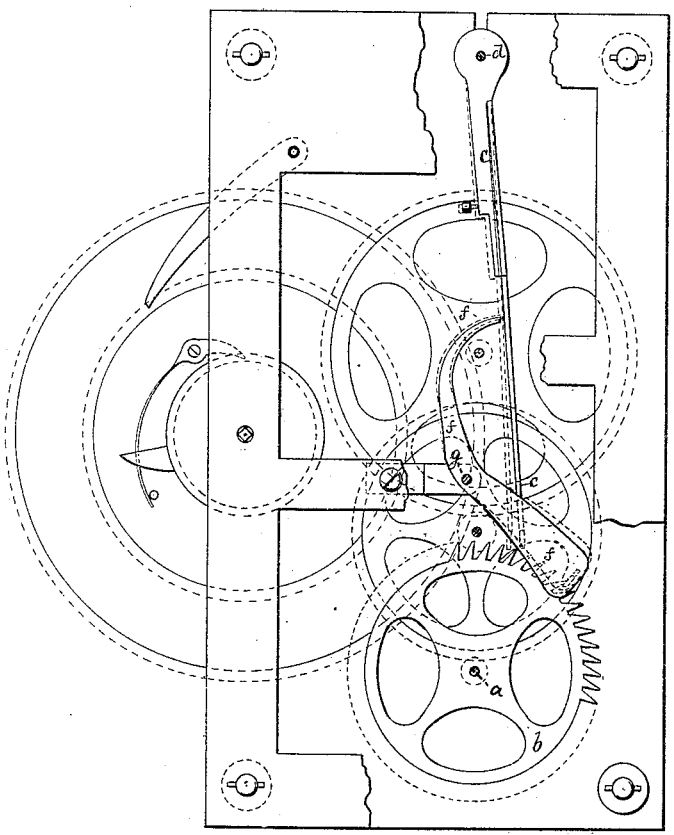
Figure 2:
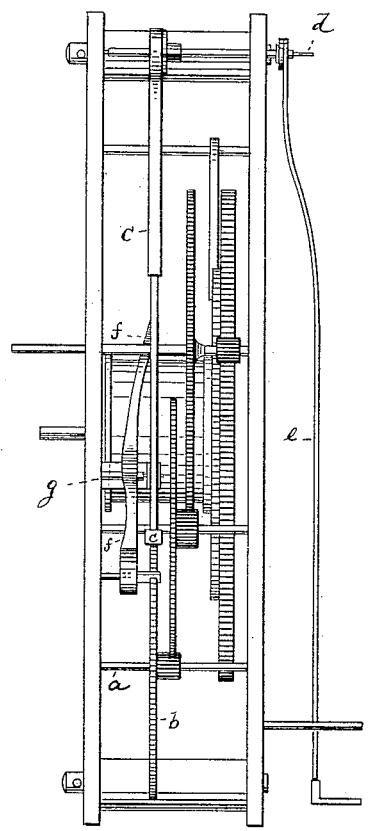
Figure 3:
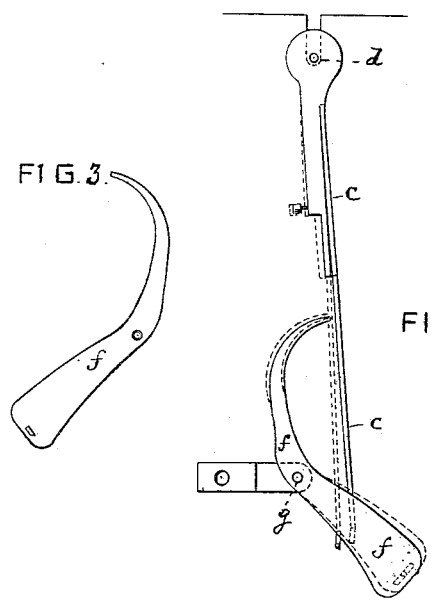

In the accompanying sheet of drawings, Figure 1 is a front view of portion of the movement, showing the escapement. Fig. 2 is a side view of the same. Fig. 3 is a detail side view of one of the pallets. Fig. 3ª is a detail face view of the escapement.

The letter $a$ represents the spindle of the second-hand, which receives motion by its pinion and by a train of gear-wheels from a weight or mainspring, as customary. Upon the spindle $a$ there is mounted the scape-wheel $b$, having sixty teeth.

$c$ is a pallet, being a long straight bar, which rests with its lower end against one of the teeth of wheel $b$, and is rigidly attached at its upper end to the arbor $d$, to which the guide-wire $e$ of the pendulum is attached.

Against the pallet $c$ bears one arm of a pallet, $f$, the other arm of which engages the teeth of wheel $b$. The pallet $f$ is bent, and is free to turn upon its arbor $g$.

The operation of the parts is as follows: As the chronometer is put into motion the pallet $c$, resting against one of the teeth of wheel $b$, is swung to the right with such tooth, carrying guide-wire $e$ with it until the pallet arrives at the position shown in full lines in Fig. 1. Then the lower end of the pallet $c$ is freed from such tooth, and owing to the oscillation of the pendulum it will be swung back to the left until it rests against the next tooth, (dotted lines, Fig. 1,) whence the operation is repeated. During the motion of pallet $c$ the lower arm of pallet $f$ will alternately engage and disengage teeth of wheel $b$ in the following manner: When the pallet $c$ has swung to the right, it swings clear of upper arm of pallet $f$, and the lower arm of such pallet will drop between two of the teeth of wheel $b$ by gravity. When, however, the pallet $c$ swings to the left, it will bear against upper arm of pallet $f$, and will raise the lower arm from out between the teeth of wheel $b$.

The main advantage of this escapement lies in the fact that the pendulum makes a forward and backward vibration during each second, and that it receives an impetus at the forward vibration only, while the backward vibration is caused solely by its own weight.

I claim as my invention—

1. The combination of arbor $a$, carrying scape $b$, with the pallet $c$, secured to the guide-wire spindle $d$, and with the independently-pivoted pallet $f$, substantially as specified.

2. The combination of arbor $a$, carrying scape $b$, with the pallet $c$, secured to the spindle $d$, and with bent pallet $f$, the upper arm of which bears against pallet $c$, while the lower arm engages the scape $b$, substantially as specified.

C. BECKER, SR.

Witnesses:
 F. V. BRIESEN,
 ROBT. H. ROY.